(12) United States Patent
Castillo Campos et al.

(10) Patent No.: US 12,173,653 B1
(45) Date of Patent: Dec. 24, 2024

(54) GAS TURBINE ENGINES AND METHODS OF CONTROLLING FORMATION OF CONDENSATES

(71) Applicant: GE Infrastructure Technology LLC, Greenville, SC (US)

(72) Inventors: Jesus Daniel Castillo Campos, San Luis Potosi (MX); Jose Carlos Sanchez Herrera, Queretaro (MX); Joe F. Schornick, Pearland, TX (US); Tuy C Huynh, Sugar Land, TX (US)

(73) Assignee: GE Infrastructure Technology LLC, Greenville, NC (US)

( * ) Notice: Subject to any disclaimer, the term of this patent is extended or adjusted under 35 U.S.C. 154(b) by 0 days.

(21) Appl. No.: 18/342,959

(22) Filed: Jun. 28, 2023

(51) Int. Cl.
*F02C 7/224* (2006.01)
*F02C 9/28* (2006.01)
*F23K 5/00* (2006.01)

(52) U.S. Cl.
CPC .......... *F02C 7/224* (2013.01); *F02C 9/28* (2013.01); *F23K 5/002* (2013.01); *F05D 2270/31* (2013.01); *F23K 2400/10* (2020.05)

(58) Field of Classification Search
CPC .......... F02C 7/224; F23K 5/002; F23K 5/005; F23K 2400/10; F23K 2400/20; F23K 2400/201
See application file for complete search history.

(56) References Cited

U.S. PATENT DOCUMENTS

| | | | |
|---|---|---|---|
| 6,401,459 B1* | 6/2002 | Tiras | F02C 3/22 60/736 |
| 2011/0192169 A1* | 8/2011 | Dooley | F02C 3/20 60/734 |
| 2012/0090331 A1* | 4/2012 | Bilton | F23K 5/00 60/734 |

FOREIGN PATENT DOCUMENTS

| EP | 1102005 B1 | 6/2004 |
|---|---|---|
| EP | 2351915 A1 | 8/2011 |

* cited by examiner

*Primary Examiner* — Scott J Walthour
(74) *Attorney, Agent, or Firm* — Armstrong Teasdale LLP

(57) ABSTRACT

A fuel conditioning system includes a heater for selectively adjusting an operating temperature of the fuel and a controller communicatively coupled to the heater. The controller configured to determine a dew point temperature of the fuel and maintain the operating temperature of the fuel at least at the determined dew point temperature of the fuel.

12 Claims, 4 Drawing Sheets

GAS TURBINE ENGINES AND METHODS OF CONTROLLING FORMATION OF CONDENSATES

BACKGROUND

The field of the disclosure relates generally to turbine engine assemblies and more particularly, to methods and systems for preventing formation of condensates in gas fuels.

Gas turbines are widely used in a variety of commercial operations, such as power generation and mechanical drive operations. Gas turbines generally include a compressor, one or more combustors, and one or more turbines. Conventionally, the compressor compresses a working fluid and discharges the compressed working fluid to the combustors. The fuel is injected into the flow of compressed working fluid and the mixture is ignited to produce combustion gases having a relatively high temperature, pressure, and velocity. The combustion gases exit the combustors and flow to the turbine, or turbines, where they expand to produce work which may be converted into electrical or mechanical power.

Condensation of fuel gases may produce serious detrimental effects in gas fuel systems and particularly within the combustors, resulting in hardware damage and erosion. Accordingly, conventional fuel supply systems for gas turbines typically have strict regulations and/or controls to prevent the formation of condensates, e.g., by heating the gas fuel before the gas fuel enters the combustor such that the temperature of the fuel is maintained above its dew point. However, such fuel supply systems typically reduce the overall efficiency of the power generation system as energy must be supplied to one or more heaters of the fuel supply system. Furthermore, the amount of thermal energy required to prevent condensation may be difficult to target because multiple factors affect the dew point temperature of the gas fuel, such as changes in pressure, changes in fuel composition, and/or changes in gas fuel flow consumption during transient phases in power generation and mechanical drive, such as during load changes or start-up.

Accordingly, a need exists for a system that can reduce the formation of condensates in gas fuels without the aforementioned drawbacks of conventional methods of maintaining gas fuel above the dew point.

SUMMARY

In one aspect, a fuel conditioning system for use with a turbine is provided. The fuel conditioning system includes a heater for selectively dynamically adjusting an operating temperature of a fuel and a controller communicatively coupled to the heater. The controller is configured to determine a dew point temperature of the fuel and maintain the operating temperature of the fuel at least at the determined dew point temperature of the fuel.

In another aspect, a method of conditioning a fuel is provided. The method includes determining a dew point temperature of the fuel and maintaining an operating temperature of the fuel to be at a temperature that is at least at the determined dew point temperature.

In another aspect, a gas turbine engine is provided. The gas turbine engine includes a combustor section and a conditioning system for conditioning a fuel. The conditioning system includes a controller configured to determine a dew point temperature and maintain the temperature of the fuel at least at the determined dew point temperature.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
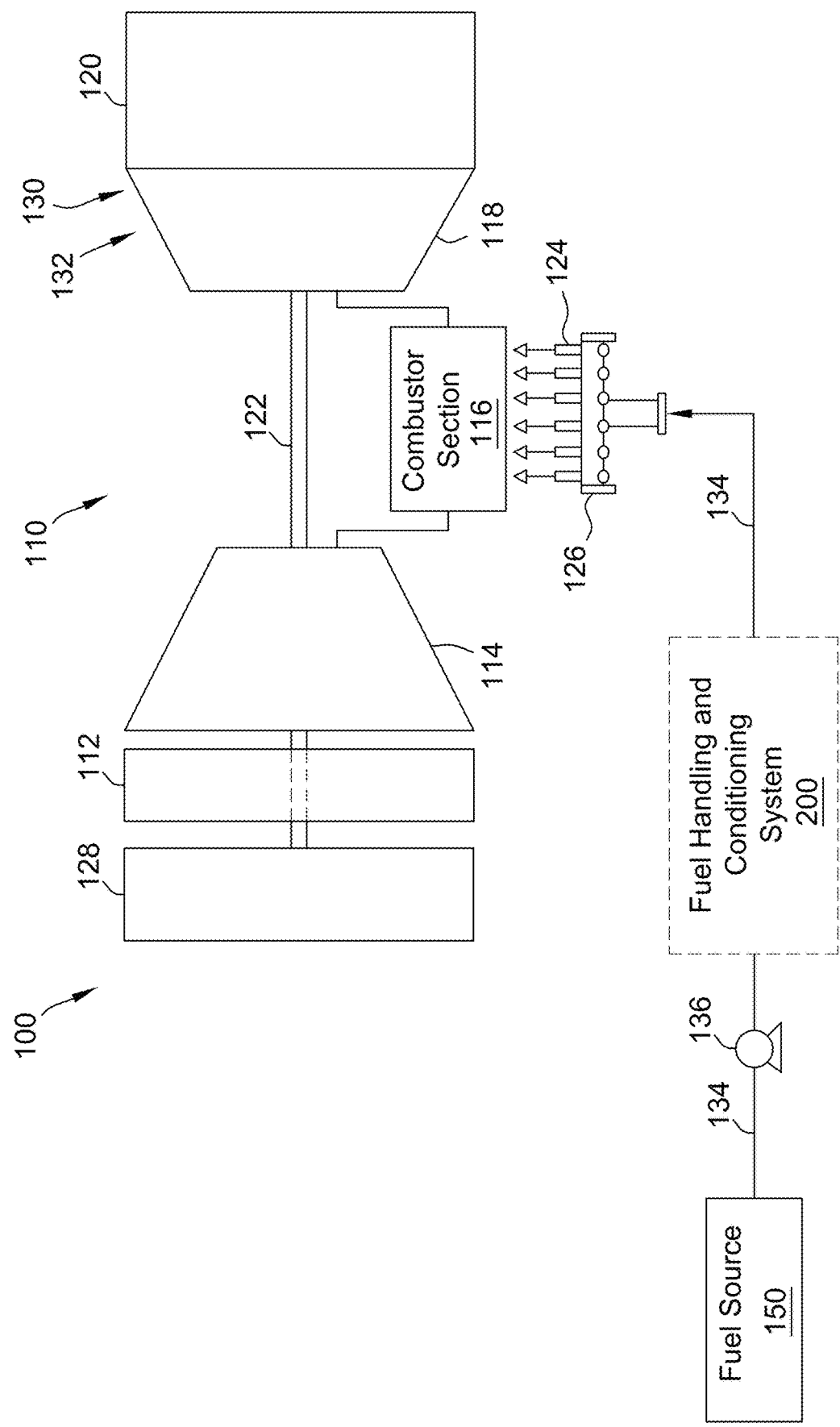
FIG. 1 is a schematic illustration of an exemplary power generation system including an exemplary conditioning system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not. Furthermore, references to "one embodiment" are not intended to be interpreted as excluding the existence of additional embodiments that also incorporate the recited features. Moreover, unless explicitly stated to the contrary, embodiments "including" or "having" an element or a plurality of elements having a particular property may include additional such elements not having that property.

As used herein, the term "real-time" refers to either the time of occurrence of the associated events, the time of measurement and collection of predetermined data, the time to process the data, or the time of a system response to the events and the environment. In the embodiments described herein, these activities and events occur substantially instantaneously.

As used herein, the terms "processor" and "computer" and related terms, e.g., "processing device," "computing device," and "controller" are not limited to just those integrated circuits referred to in the art as a computer, but instead refer broadly to a microcontroller, a microcomputer, a programmable logic controller (PLC), an application specific integrated circuit, and/or other programmable circuits, and such terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to only being, computer peripherals associated with an operator interface such as a mouse and a keyboard. Alternatively, other computer peripherals may also be used such as, but not limited to, a scanner or a touchscreen. Furthermore, in the embodiments described herein, additional output channels may include, but are not limited to only being, an operator interface monitor.

Embodiments described herein relate to power generation and mechanical drive systems that utilize a conditioning system for conditioning a fuel to reduce, and/or to prevent, the formation of condensates, while improving the energy efficiency of the power generation and mechanical drive system. Fuel condensates have detrimental effects on gas turbine engines, particularly if the fuel condensates are injected into a combustor section. For example, over time condensates may erode components of the gas fuel system, such as manifolds or the combustor, and/or produce excess emissions. Maintaining the fuel at temperatures that facilitate limiting the formation of condensates may include one or more technical challenges: i) targeting a dew point temperature in real-time may be challenging because the dew point temperature may fluctuate depending on the pressure, and/or fuel composition, and/or during transient phases of power generation or mechanical drives, such as startups, shutdown, load addition/reduction, for example; and ii) supplying energy to a heater, for heating the fuel, reduces the overall energy efficiency of the power generation system. Embodiments described herein maintain the temperature of the gas fuel above its dew point while reducing the amount of energy required to be supplied to a heater, thus improving the performance and efficiency of gas turbine engines and/or power generation systems. In some embodiments described herein, the pressure of the fuel is adjusted to decrease the real-time dew point temperature, thereby facilitating reducing an amount of thermal energy required to maintain the temperature of the fuel above the dew point temperature and reducing the amount of power that is required to be supplied to a heater. In some embodiments described herein, the pressure of the fuel is adjusted to facilitate reducing or minimizing the temperature drops in the fuel, thereby facilitating reducing an amount of thermal energy required to maintain the temperature of the fuel at or above the dew point temperature and reducing the amount of power that is required to be supplied to a heater. In some embodiments described herein, power generation output of the power generation system, e.g., power demanded by the power grid and/or a variable load demanded by a synchronized device, is maintained by ensuring that a required amount of fuel is supplied to the combustor section.

Referring now to the drawings, FIG. 1 is a schematic of an exemplary power generation or mechanical drive system 100 including a turbine engine 110, e.g., a gas turbine engine, and a fuel handling and conditioning system 200 for use in conditioning a fuel. While the exemplary embodiment is illustrated in association with a gas turbine engine, the present invention is not limited to any one particular engine, and one of ordinary skill in the art will appreciate that the current invention may be used in connection with other turbine engines. As used herein, the terms "turbine," "turbine assembly," and "turbine engine" shall be used interchangeably.

In the exemplary embodiment, turbine engine 110 includes an intake section 112, a compressor section 114 coupled downstream from intake section 112, a combustor section 116 coupled downstream from compressor section 114, a turbine section 118 coupled downstream from combustor section 116, and an exhaust section 120. Turbine section 118 is coupled to compressor section 114 via a rotor shaft 122. The combustor section 116 may include a plurality of combustors, not shown. Combustor section 116 is coupled to compressor section 114 such that the compressor section 114 is in flow communication with the combustor section 116.

A fuel injector 124 is coupled to the combustor section 116. In some embodiments, the turbine engine 110 includes a manifold or manifolds 126 including a plurality of the fuel injectors 124. Turbine section 118 is coupled to compressor section 114 and to a load 128 such as, but not limited to, an electrical generator and/or a mechanical drive application. In the exemplary embodiment, each compressor section 114 and turbine section 118 include at least one rotor disk assembly 130 that is coupled to a rotor shaft 122 to form a rotor assembly 132.

During operation, intake section 112 channels air towards compressor section 114 wherein the air is compressed to a higher pressure and temperature prior to the fuel mixture being discharged towards combustor section 116. The compressed air is mixed with a fuel mixture and ignited to generate combustion gases that are channeled towards turbine section 118. More specifically, in the combustor section 116, a fuel, or fuel mixture, is injected into the air flow, and the fuel-air mixture is ignited to generate high temperature combustion gases that are channeled towards turbine section 118. Turbine section 118 converts the thermal energy from the gas stream to mechanical rotational energy, as the combustion gases impart rotational energy to turbine section 118 and to rotor assembly 132.

The conditioning system 200 is coupled in flow communication with a fuel source 150. The fuel source 150 supplies a fuel mixture to the conditioning system 200, and fuel source 150 may be a variable fuel source that delivers various types and/or mixtures of fuel. Fuel source 150 may store and/or supply natural gas, liquified petroleum gases (LPG) blends, methane, hydrogen, hydrogen/natural gas blends, coke oven gas, refinery gases and any suitable gas fuel or gas fuel mixture, for example. The fuel supplied and/or stored by the fuel source, may be adjustable based on the operating conditions and/or availability of one or more fuel sources. The conditioning system 200 conditions the fuel and supplies the conditioned fuel downstream to the combustor section 116, e.g., delivered to the fuel injector(s) 124 and/or the manifold(s) 126. In the exemplary embodiment, conditioning system 200 conditions the fuel by controlling at least one of the temperature, pressure, and/or flow rate of the fuel.

The turbine engine 110 and/or the conditioning system 200 may include one or more conduits, pipes, ducts, and/or tubes, generally referred to herein as conduits 134, used to transfer fuel between components. For example, one or more conduits 134 may transfer gaseous fuel from the fuel supply source 150 to the conditioning system 200 prior to the conditioned fuel being transferred from the conditioning system 200 to the combustor section 116. Fuel may be motivated to move through conduits 134 from upstream components to downstream components using gravitational forces. Alternatively, and/or additionally, fuel may be pressurized through conduits 134 using compressors or pumps 136, for example.

In the exemplary embodiment, the conditioning system 200 maintains the temperature of the fuel at temperatures that facilitate eliminating, reducing, and/or preventing, the formation of condensates in the gaseous fuel. In particular, the conditioning system 200 maintains the temperature of the gaseous fuel at, or above, the dew point. At temperatures below the dew point temperature one or more components of the fuel may condense, e.g., one or more components of the fuel may change from a gaseous state into a liquid state. The conditioning system 200 maintains the fuel at or above the dew point temperature, thus preventing the constituents of the fuel from condensing into a liquid state. The conditioning system 200 may maintain the fuel at any suitable temperature and/or range of temperatures that facilitates preventing condensation from occurring. In some embodiments, a target temperature and/or a targeted range of temperatures for the conditioning system 200 may be preselected, e.g., by an operator. The target temperature or temperature range may be set at a dew point temperature, a temperature that is greater than (e.g., superheat) or equal to the dew point temperature, a temperature that is about 15° hotter than the dew point temperature, a temperature that is hotter than or equal to about 15° above the dew point temperature, a temperature that is about 20° hotter the dew point temperature, a temperature that is hotter than or equal to about 20° above the dew point temperature, and/or any other temperature or temperature range that is suitable for a combustion operation.

Figure 2:
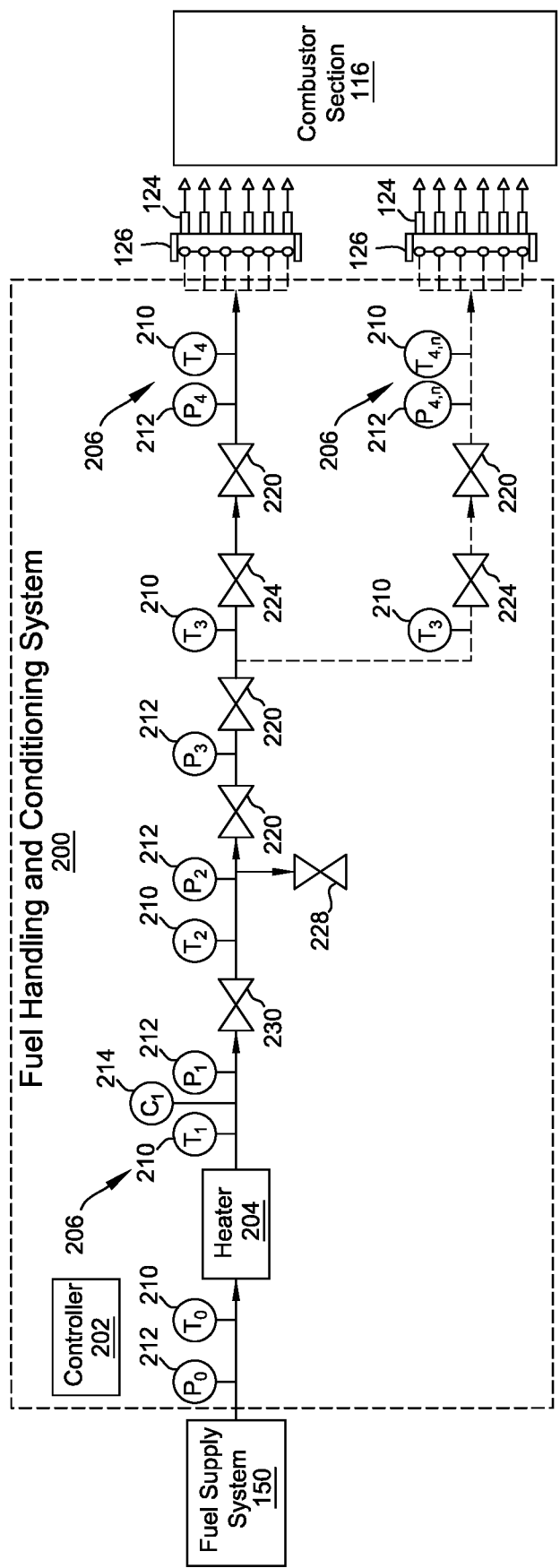
FIG. 2 is a schematic illustration of the conditioning system shown in FIG. 1.

In reference to FIG. 2, in the exemplary embodiment, the conditioning system 200 includes a controller 202 that controls at least one parameter of the conditioning system 200, and a heater 204 that supplies thermal energy to the fuel to increase the operating temperature of the fuel. The controller 202 is communicatively coupled to the heater 204 and may transmit output signals to the heater 204 to adjust the amount of thermal energy that the heater 204 supplies to the fuel.

In the exemplary embodiment, the conditioning system 200 includes at least one sensor 206 that is communicatively coupled to the controller 202. The controller 202 may receive, in-real time, parameters measured by the sensor 206. In the exemplary embodiment, the at least one sensor includes at least a temperature sensor 210, a pressure sensor 212, and at least one composition sensor 214. The sensors 206 may also include other sensors, such as, but not limited to, a flow sensor 216, e.g., a flow meter, used to measure a flow parameter of the fuel, such as a flow velocity and/or a mass flow rate of the fuel, see FIG. 3. The composition sensor 214 may detect at least one constituent of the fuel, e.g., a chemical structure of each of the constituents and/or an amount of each constituent, and/or a percent amount of each constituent.

The conditioning system 200, in the exemplary embodiment, includes a pressure control device 230 that may be used to control, e.g., increase or decrease, the operating pressure of the fuel. The pressure control device 230 may be any suitable device that enables the operating pressure of the fuel to be variably controlled, such as, but not limited to only being, a valve, a flow control valve (FCV), e.g., a fuel metering valve (FMV), a pressure control valve (PCV), and/or a regulator. The conditioning system 200 includes at least one flow control device 224 that may be used to control, e.g., increase or decrease, a flow parameter of the fuel. The flow parameter may include a mass flow rate, a flow velocity, a mass, and/or volume of fuel. Flow control device(s) 224 may include a pump and/or valve, e.g., a solenoid valve (SOV). The controller 202 is also communicatively coupled to the flow control device(s) 224 and the pressure control device 230. The controller 202 may transmit output signals to the flow control device(s) 224, to cause the flow of the fuel to be variably adjusted. The controller 202 may also cause the pressure control device 230 to variably adjust the operating pressure of the fuel. As will be described in further detail herein, the flow control device(s) 224 is used to regulate an amount of fuel supplied to the manifolds 126 and the combustor section 116. In some embodiments, the flow control device(s) 224 may regulate the pressure of the fuel supplied to the manifolds 126 and the combustor section 116. The controller 202 may determine an amount of fuel and the pressure of the fuel supplied to the manifold 126 and the combustor section 116 to meet the power demand.

The conditioning system 200 includes at least one flow stop valve 220 to stop the flow of fuel to the fuel injectors 124 (e.g., nozzles) and/or manifold 126 when commanded by the controller 202.

The conditioning system 200 may include a plurality of pressure control devices 230, a plurality of flow control devices 224, a plurality of stop valves 220, and/or a plurality of manifolds 126. In some embodiments, a first pressure control device 230 is downstream from the heater 204 and upstream from a first flow control device 224. At least one stop valve 220 is downstream from the first pressure control device 230. At least one pressure/flow control device 224 is downstream from the second stop valve 220. In some embodiments, the conditioning system 200 may include more or less stop valves 220 and/or flow control devices 224, located in any orientation between the heater 204 and the combustor section 116. The conditioning system 200 may also include at least one relief flow control device 228, such as, for example, a first relief flow control device 228 between the first pressure control device 230 and the first stop valve 220. In some embodiments, a third stop valve 220 is downstream from the second pressure/flow control device 224 and upstream from the combustor section 116.

The conditioning system 200 may include a plurality of temperature sensors 210 and a plurality of pressure sensors 212. A first temperature sensor 210, detecting, e.g., measuring, a temperature $T_0$ and a first pressure sensor 212, detecting a pressure $P_0$, may be upstream from the heater 204 and downstream from the fuel supply source 150. A second temperature sensor 210, detecting a temperature $T_1$, and a second pressure sensor 212, detecting a pressure $P_1$, may be downstream from the heater 204 and upstream from the first pressure control device 230. A third pressure sensor 212, detecting pressure $P_2$, and a third temperature sensor 210, detecting a temperature $T_2$, may be between the first pressure control device 230 and the first stop valve 220. A fourth pressure sensor 212, detecting a pressure $P_3$, may be between the first and second stop valves. A fourth temperature sensor 210, detecting temperature $T_3$, may be downstream from the second stop valve 220 and upstream from the second flow control device 224. A fifth pressure sensor 212, detecting a pressure $P_4$, and a fifth temperature sensor 210, detecting a temperature $T_4$, may be downstream from the second flow control device 224 and upstream from the manifolds 126.

The controller 202 determines in real-time a dew point based on input signals received from at least one sensor 206. The controller 202 may receive, or retrieve, sensor data periodically, e.g., every second, every 30 seconds, or every minute, for example. The controller 202 may receive or retrieve sensor data as frequently as necessary to determine a real-time dew point temperature. The controller 202 may transmit output signals to the heater 204, based on the determined dew point temperature, a measured temperature, and/or a measured pressure of the fuel, and/or instantaneous fuel flow rate through flow control devices 224, and/or a required superheat temperature, as described in more detail below.

In some embodiments, the gas turbine engine 110 and the power generation and/or mechanical drive system 100 may have a target operational speed and/or a target load. The target load may represent an amount of power, which is needed by the power grid or needed by a mechanical load, for example. Accordingly, the gas turbine engine 110 may require a specified amount of fuel supplied to the combustor section 116 in order for the power generation system 100 to produce the desired target power. The controller 202 may determine an amount, e.g., a volume and/or a mass flow volume, of fuel that needs to be supplied to the combustor section 116.

In some embodiments, the controller 202 may determine a fuel flow rate, a rate of change of a fuel flow rate, a volume, and/or a mass flow volume of fuel to be supplied to the combustor section 116. The controller 202 may determine the fuel flow and/or the rate of change of the fuel flow rate during transient phases of power generation, e.g., start-up or during changes in power demand or changes in mechanical load. The controller 202 may determine a target fuel flow rate, a rate of change of the fuel flow rate, a volume and/or a mass flow volume to be supplied to the combustor in order to meet a change in the power demand or a change in the mechanical load. The controller 202 may also transmit output signals to the flow control device 224 to cause the flow control device 224 to deliver the determined amount of fuel to the combustor section 116.

Figure 3:
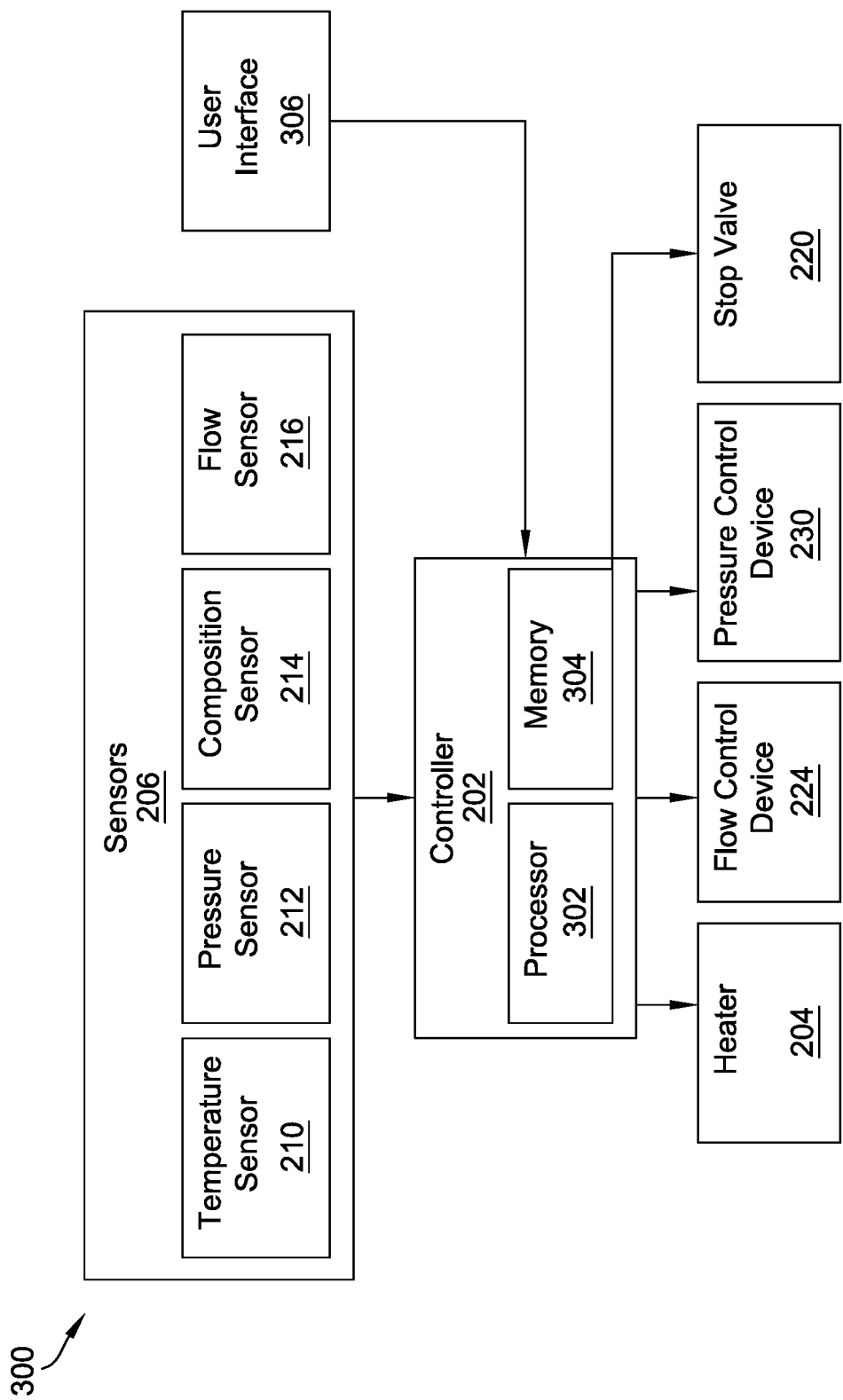
FIG. 3 is a block diagram of an exemplary control system that may be used with the conditioning system shown in FIG. 2.

FIG. 3 shows an exemplary block diagram of a control system 300 including controller 202, that may be used with the conditioning system 200, shown in FIG. 2, and/or the gas turbine engine 110, shown in FIG. 1, to facilitate reducing and/or preventing the formation of condensates in the fuel. In the exemplary embodiment, controller 202 includes a processor 302 that is communicatively coupled to a memory 304. Memory 304 may include a non-transitory computer-readable medium and program that are accessed by processor 302 to execute operations to control one or more of the temperature, pressure, and/or a flow parameter of the fuel. Controller 202 is communicatively coupled to at least one sensor 206, e.g., a pressure sensor 212, a temperature sensor 210, a flow sensor 216, and/or to the composition sensor 214, to receive input signals from the sensor(s) 206 that include measurements related to the pressure, temperature, composition, and/or flow parameters of fuel.

Controller 202 processes, using processor 302, input signals received from sensors 206 and determines output signals to transmit to at least one of the heater 204, the pressure control device 230, the stop valve 220, and/or the flow control device 224 in order to adjust any or all of the following: i) an amount of thermal energy supplied to the fuel, ii) the operating pressure of the fuel, and/or iii) a flow parameter of the fuel. The controller 202 processes, using processor 302, input signals received from any or all of the composition sensor 214, the pressure sensor 212, and/or the temperature sensor 210, to determine a dew point temperature of the fuel. In some embodiments, the controller 202 processes, using processor 302, input signals received from a user interface 306. The user interface 306 enables a user, e.g., a power plant operator, to communicate with the controller 202. The user interface 306 may enable the operator to transmit inputs to the controller 202.

In some embodiments, the controller 202 may determine a real-time dew point temperature of the fuel using real-time values for the pressure and/or the composition of the fuel. The controller 202 may determine, e.g., update, the real-time dew point temperature frequently, e.g., every min. and/or every 10 mins. In some embodiments, the controller 202 determines the real-time dew point temperature each time the controller 202 transmits an output signal to any of the heater 204, the pressure control device 230, the stop valve 220, and/or the flow control device 224. In some embodiments, the controller 202 may determine the real-time dew point temperature, as frequently as a pressure is detected using the pressure sensor 212. For example, the pressure sensor 212 may detect the pressure at a sampling rate of 1-10 times per second. In some embodiments, the controller 202 may determine the real time dew point temperature as frequently as the composition is detected. The composition sensor 214 may detect the fuel composition every five seconds, every minute, and/or every five minutes. In some embodiments, the controller 202 may determine the real time dew point temperature using the detected pressure which is sampled at a higher rate than the composition and accordingly the controller 202 may determine the real time dew point temperature using the same composition over a plurality of determined real time dew-point temperatures. The controller 202 may determine the real time dew point temperature as frequently as necessary to enable the conditioning system 200 to function as described herein.

In some embodiments, the controller 202 may compare input signals, e.g., received from sensors 206, to pre-stored criterion, e.g., a threshold or a threshold rate of change, e.g., a temperature, a determined dew point temperature, and/or a superheat temperature, and if the input signals satisfy the criterion, the controller 202 may also determine an updated real-time dew point temperature, and updated temperature comparison between a detected temperature and the determined dew point, and determined thermal energy to be supplied to the heater 204. The controller 202 may determine the real-time dew point temperature as frequently as necessary to enable the controller 202 and the conditioning system 200 to function efficiently as described herein. The controller 202 may determine the real-time dew point temperature at any location, e.g., any location between any or all of the components. For example, the controller 202 may determine the real-time dew point temperature at any location downstream from the heater 204. Moreover, the controller 202 may determine the dew point temperatures at multiple locations between the heater 204 and the fuel injectors 124 and using the multiple pressures and compositions, may calculate the dew point temperatures such as by calculating a mean temperature, an average temperature, or any other method that enables the controller 202 to operate as described herein.

In some embodiments, the controller 202 determines, e.g., using processor 302, an amount of thermal energy that the heater 204 must supply to the fuel to maintain the fuel within a target fuel temperature range. The target fuel temperature range may be based on the real-time dew point temperature and may be compared to a range of temperature inputs received from the user interface 306. In some embodiments, the controller 202 may determine, e.g., using processor 302, a pressure adjustment that will cause the real-time dew point temperature to decrease and/or the temperature drop through the conditioning system 200 to decrease. In some embodiments, the controller 202 may determine, e.g., using processor 302, a required amount of fuel that needs to be supplied to the combustor section 116, to ensure that the power generation system 100 satisfies the demands imposed by the power grid or by a mechanical load. In some embodiments, the controller may determine, e.g., using processor 302, the thermal energy that the heater must supply to the fuel to maintain the fuel within a target fuel temperature range, above the real-time dew point temperature, during a transient phase, e.g., start-up, of the power generation system and/or mechanical drive 100, and/or during other transient phases such as increasing the load on the system 100.

In some embodiments, the controller 202 may determine, e.g., using processor 302, the increase in fuel flow demand during any transient phase, e.g., start-up or load ramp, from an initial fuel flow rate to the target flow rate of the target speed or load, and the controller 202 may adjust the thermal energy required to add to the gas fuel during, or prior, to the transient phase to compensate for the temperature drop that would have occurred during the transient phase. The controller 202 may determine, or predict, the increase in fuel flow demand prior to the transient phase, such that the controller may adjust an amount of thermal energy being supplied to the fuel, e.g., by the heater 204, before the transient phase occurs. The controller 202 may determine or predict one or more other future parameters, e.g., a future temperature drop, a future pressure drop, etc., prior to the transient phase in order to preemptively adjust operating parameters, e.g., pressure, temperature, and flow rate, before the transient phase occurs.

Figure 4:
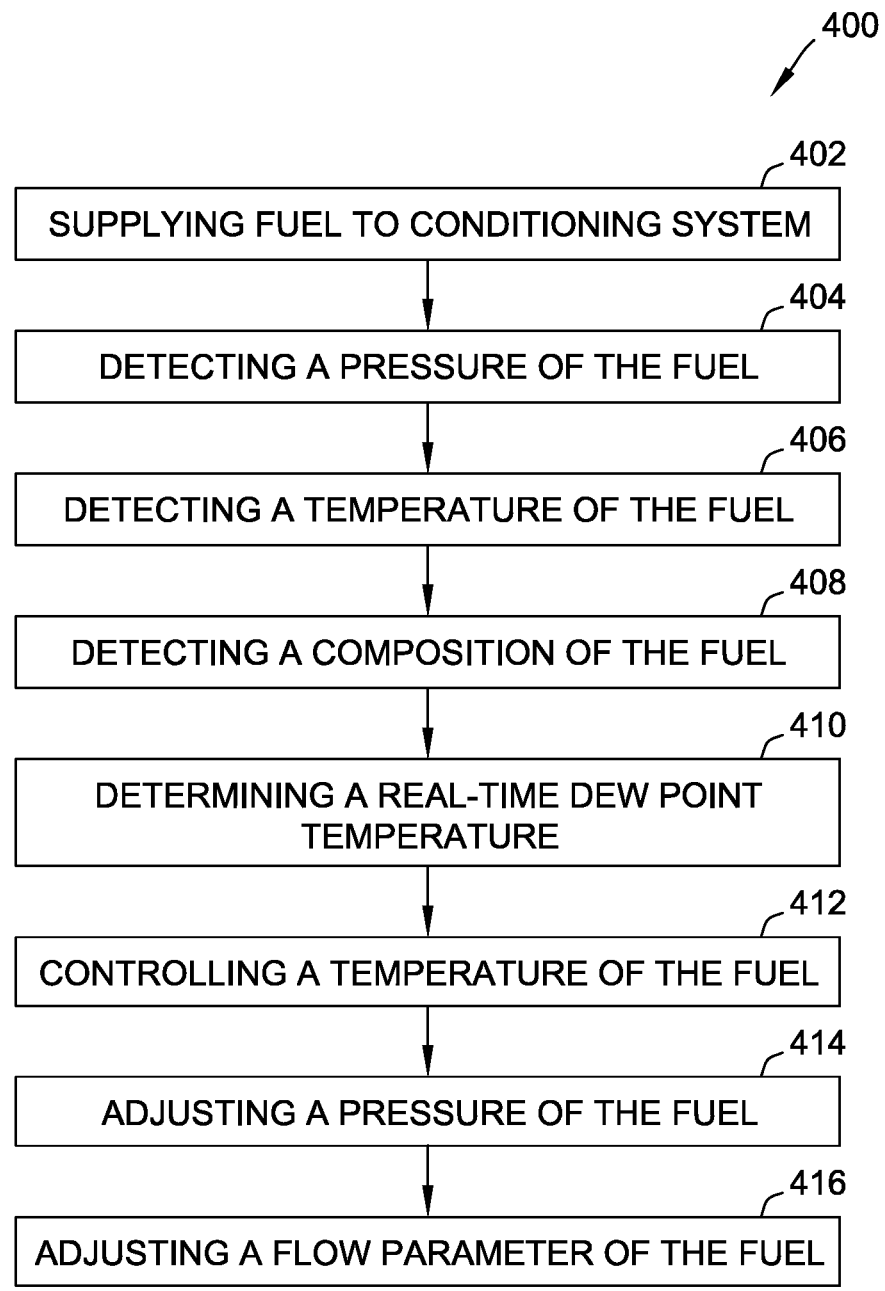
FIG. 4 is a process flow of an exemplary method of conditioning a fuel in a gas turbine engine.

FIG. 4 is a flow chart of an exemplary method 400 that may be implemented to condition fuel supplied to a gas turbine engine, e.g., gas turbine engine 110, to facilitate reducing or preventing the formation of condensates. With reference to FIGS. 1-3, in the exemplary embodiment, method 400 includes supplying 402 fuel to a conditioning system, e.g., conditioning system 200, from a fuel source, e.g., fuel source 150. Fuel may be supplied 402 to the conditioning system 200 via one or more conduits 134 and, if necessary, using one or more flow motive devices, e.g., compressors and/or pumps 136, to force the fuel through the conduits 134 to the conditioning system 200. The fuel source 150 may be a variable supply fuel source capable of supplying various types and/or mixtures of fuels. The type of fuel, fuel mixtures, and relative ratios of fuel mixture constituents, for example, may be selected based on operating conditions of the gas turbine engine 110, the power generation and/or mechanical drive system 100, and/or availability of fuel sources.

Method 400 includes detecting 404 a pressure of the fuel using at least one pressure sensor 212, detecting 406 a temperature of the fuel using at least one temperature sensor 210, and/or detecting 408 a fuel composition using at least one fuel composition sensor 214. In some embodiments, method 400 includes detecting a flow parameter of the fuel using a flow sensor 216.

In some embodiments, the method 400 includes monitoring, using the controller 202, at least one of the detected temperature, the detected pressure, the detected fuel composition, and/or the detected flow parameter of the fuel. Monitoring may include determining if the detected parameters satisfy pre-defined criteria. For example, monitoring may include the controller 202 comparing the detected temperature to a temperature threshold. In another example, monitoring may include the controller 202 comparing the detected pressure to a pressure threshold. In another example, monitoring may include the controller 202 comparing the detected flow parameter to a flow parameter threshold. In another example, monitoring may include the controller 202 comparing a real-time flow parameter with a target flow parameter prior to a transient phase of the turbine section 118, e.g., an acceleration of the turbine section 118.

In another example, monitoring may include the controller 202 comparing the detected temperature to a pre-defined minimum temperature criteria based on the dew point temperature with an additional superheat. Criterions may be determined by the controller 202 and/or may be pre-defined by an operator, e.g., using the user interface 306.

Method 400 also includes determining 410, by the controller 202, a real-time dew point ($T_{dew\ pt.}$). Determining 410 the real-time dew point temperature ($T_{dew\ pt.}$) may include the controller 202 receiving one or more inputs from sensors 206, including one or more of the pressure, temperature, fuel composition, a flow parameter, and/or a flow Increment parameter, to occur during an acceleration of the turbine before the transient occurs. The flow increment may be a difference in the fuel flow between the current flow parameter and the target flow parameter, e.g., after a transient phase. For example, the controller 202 may receive an operating pressure of the fuel from the pressure sensor 212 (e.g., any of the first, second, third, and/or fourth pressure sensors 212), an operating temperature of the fuel from the temperature sensor 210 (e.g., any of the first, second, third, and/or fourth temperature sensors 210), and/or a fuel composition from the composition sensor 214. The controller 202 may receive a mass flow rate from the flow sensor 216. The controller 202 may determine 410, e.g., by performing one or more calculations, the real-time dew point temperature using one or more of the parameters detected by the sensors 206. Additionally, and/or alternatively, the controller 202 may determine 410 the dew point temperature using one or more lookup searches to find a value for the real-time dew point temperature within a table of known dew point temperatures based on at least one of the parameters detected by the sensors. For example, the controller 202 may use an operating pressure $P_0$, and the current composition of the fuel, to determine 410 an associated real-time dew-point temperature. Method 400 may determine 410 the real-time dew point using any suitable methodologies.

The controller 202 may determine 410 the real-time dew point temperature at any suitable location between the heater 204 and the combustor section 116. In some embodiments, the controller 202 determines 410 the real-time dew point temperature at multiple locations between the heater 204 and the combustor section 116. In some embodiments, the controller 202 may determine 410 the real-time dew point temperature at, and/or in close proximity to, any and/or each of the pressure sensors 212, using the pressure, e.g., $P_0$, $P_1$, $P_2$, $P_3$, and/or $P_4$, measured by the pressure sensors 212, and the composition determined by the composition sensor 214. The controller 202 may determine 410 the real-time dew point temperature at all every location of the one or more pressure sensors 212.

In some embodiments, determining 410 the real-time dew point ($T_{dew\ pt.}$) may include the controller 202 determining one or more of the following parameters: one or more equations of state (EOS), fuel composition, compressibility factor (Z), specific heat ($c_p$), a coefficient of thermal expansion ($\alpha$), and/or pressure (P). The controller 202 may determine 410 the EOS, the compressibility factor (Z), the specific heat ($c_p$), and/or the coefficient of thermal expansion ($\alpha$) based on the composition of the fuel, received from the composition sensor 214. In some embodiments, determining 410 the real-time dew point may include the controller 202 determining a target amount of fuel, a target fuel rate, and/or a target incremental amount of fuel, based on a real-time flow and the flow to meet a target load and/or speed (described below) and a gas cooling factor, e.g., the Joule-Thomson coefficient, JT, caused by decreases in pressure of the fuel as the fuel is supplied from upstream components to downstream components, e.g., through conduits 134, pumps and/or compressors 136, pressure control devices 230, stop valves 220, and/or flow control devices 224.

In some embodiments, the method 400 may include determining, by the controller 202, the Joule-Thomson coefficient, $\mu_{JT}$. See equation 1 below. The controller 202 may determine the Joule-Thomson coefficient using one or more of the EOS, volume V, thermal capacity $C_p$, coefficient of thermal expansion $\alpha$, fuel composition detected by the composition sensor 214, and temperature T. The controller 202 may use the determined the Joule-Thomson coefficient, $\mu_{JT}$ to determine changes in temperature of the fuel between an upstream location and a downstream location. For example, the gas fuel temperature may decrease as the fuel moves and expands from a higher-pressure upstream location to a lower pressure downstream location. Method 400 may include determining the Joule-Thomson coefficient by determining the ratio of a change in temperature between an upstream location and a downstream location $\delta T_{1,n\to 2,n}$, where n represents one or more of the manifolds 126 or injectors 124, to a change in operating pressure between the upstream and downstream locations.

In some embodiments, the method 400 may include proactively estimating the Joule-Thomson coefficient $\mu_{JT}$, that would result after, or during, a transient phase, e.g., speed/load ramp-up of the turbine engine 110, by determining a ratio of a change in temperature and pressure between an upstream location and a downstream location, $$\frac{\delta T_{1,n\to 2,n}}{\delta P_{1,n\to 2,n}}.$$

The method 400 may include using the change in temperature $\delta T_{1\to 2}$ to determine a target change in operating pressure between the upstream and downstream locations prior to the occurrence of the transient phase.

$$\mu_{JT} = \frac{\delta T_{1,n\to 2,n}}{\delta P_{1,n\to 2,n}} = \frac{V}{c_p}(\alpha T - 1) \tag{1}$$

In some embodiments, the method 400 may include determining a target temperature or temperature range, based on the determined real-time dew point temperature and/or based on user inputs, e.g., operator settings Such as a superheat requirement, and/or flow rate increment to occur during a transient phase of the gas turbine prior to the occurrence of the transient phase. For example, a target temperature and/or temperature range may include a dew point temperature, a temperature higher than or equal to a dew point, a temperature that is about 15° above the dew point temperature, a temperature that is higher than or equal to about 15° above the dew point temperature, a temperature that is about 20° above the dew point, a temperature that is higher than or equal to about 20° above the dew point temperature, and/or any temperature or temperature range that is suitable for a combustion operation.

Method 400 includes controlling 412 a temperature of the fuel. The controller 202 may control 412, increase or decrease, the operating temperature of the fuel, to maintain the fuel temperature at the target temperature and/or within the target temperature range At steady flow conditions, or at anticipated flow increment during an anticipated transient phase, such as acceleration of the turbine section 118.

Controlling a temperature may include the controller 202 determining an operating temperature (To) of the fuel, e.g., from the temperature sensor 210 at any suitable location downstream from the heater 204. Controlling 412 the temperature may include the controller 202 comparing the determined real-time dew point temperature to an operating temperature, e.g., a temperature $T_1$, $T_2$, $T_3$, or $T_4$, measured by temperature sensors 210. The controller 202 may calculate a temperature difference between the operating temperature and the real-time dew point, e.g., $T_0 - T_{dew\ pt}$.

In some cases, the operating temperature may be higher than or equal to the real-time dew point. In some cases, the operating temperature may be less than the real-time dew point temperature. In some cases, the operating temperature may be higher than the determined estimated dew point temperature plus a superheat requirement which would be needed after an acceleration process of the gas turbine due to a demanded speed and/or load demand.

In some embodiments, controlling 412 the temperature of the fuel may include determining an amount of thermal energy (Q) and/or a thermal energy rate ($\dot{Q}$) that needs to be supplied to the fuel to raise the operating temperature of the fuel to the target fuel temperature and/or to the target fuel temperature range, and/or a thermal energy rate that would be needed to be supplied to the fuel to maintain a target fuel temperature plus a target superheat for an estimated target flow demand of the turbine, after a transient phase, such as after an acceleration of the turbine section 118, has occurred to meet a required increase in load and/or speed, see equation 2 below. The controller 202 may determine the amount of thermal energy and/or thermal energy rate based on at least one of pressure, temperature, and/or the difference in temperature ($\Delta T = T_0 - T_{dew\ pt}$), specific heat ($c_p$), the real-time dew point temperature ($T_{dew\ pt}$), a targeted temperature and/or a target temperature range, a mass flow rate ($\dot{m}$), a target mass flow rate increment for an anticipated acceleration transient, a coefficient of thermal expansion ($\alpha$).

$$\dot{Q} = \dot{m} * c_p \Delta T \tag{2}$$

Controlling 412 the temperature may include transmitting output signals to the heater 204 to cause the heater 204 to adjust an amount of thermal energy or the thermal energy rate that the heater 204 supplies to the fuel. The controller 202 may transmit signals to the heater 204 to cause the heater 204 to supply the determined amount of thermal energy required to increase the temperature of the fuel to the target temperature and/or temperature range. Controlling 412 the temperature may include the controller 202 determining a real-time temperature rate of change, $T_{RT-RoC}$. The controller 202 may determine the temperature rate of change by calculating a difference in temperature at a first location, e.g., a downstream location, a location that is in close proximity to the combustor section 116, and the real-time dew point temperature over a duration of time, $\partial(t)$. The controller 202 may compare the determined $T_{RT-RoC}$ to a target $T_{RoC}$. For example, the controller 202 may determine if the $T_{RT-RoC}$ is greater than or equal to the target $T_{RoC}$, see equation 3.

To control 412 the temperature, may include controller 202 dynamically transmitting signals to the heater 204 to increase the thermal energy added to the fuel to maintain the left side of equation (3) always greater than the rate of change specified in the right side of equation (3), during steady flow conditions, and/or during acceleration processes to meet speed and/or load increments. Controlling 412 the temperature may in parallel also include the controller 202 dynamically transmitting signals to the pressure control device 230 to reduce the pressure measured by pressure sensor 212, to reduce the pressure drop through conditioning system 200, thus reducing the temperature drop as estimated by equation (1) during either steady flow conditions, and/or during transient phases.

$$\frac{\partial (T_{2,n} - T_{dew2,n})}{\partial (t)} \geq T_{RoC} \qquad (3)$$

Method 400 may include improving the efficiency of the power generation and/or mechanical drive system 100. Improving the efficiency may include reducing the power consumption of the heater 204. Improving the efficiency may include reducing the real-time dew point temperature to decrease the amount of thermal energy required to raise the temperature of the fuel to the target temperature. Improving the efficiency may also include reducing the amount of thermal energy required to raise the temperature of the fuel to the target temperature and/or to the temperature range. For example, the real-time dew point temperature may be decreased by adjusting, e.g., increasing or decreasing, the pressure of the fuel. In some cases, method 400 may decrease the pressure to decrease the real-time dew point temperature. In some alternative cases, method 400 may increase the pressure in order to decrease the real-time dew point temperature. In the embodiments illustrated herein, the controller 202 may adjust the pressure, increase, or decrease, in order to decrease the real time dew point temperature. In some embodiments, the controller 202 may adjust the pressure to target any suitable temperature of the fuel, e.g., a target dew point temperature and/or a target superheat temperature.

The method 400 also includes adjusting 414 a pressure of the fuel, by the controller 202 transmitting signals to the pressure control device 230. The controller 202 may adjust the pressure of the fuel to decrease the dew point temperature of the fuel. The controller 202 may adjust the pressure of the fuel in order to decrease a temperature drop through conditioning system 200. The controller 202 may adjust the pressure of the fuel to decrease the amount of thermal energy required to heat the fuel. After the pressure is adjusted, method 400 includes determining 410, e.g., determining again, the real-time dew point temperature and target temperature and/or temperature ranges. In some embodiments, adjusting 414 may include the controller 202 transmitting a signal to the pressure control device 230 to cause a decrease, or an increase, in the operating pressure of the fuel on $P_2$, thus reducing the temperature drop through fuel control device 224, and therefore decreasing the thermal energy required from heater 204 to maintain the target temperature and/or temperature range. After the real-time pressure $P_2$ has been decreased, the controller 202 may determine an updated thermal energy and/or a thermal energy rate to be supplied to fuel to maintain the temperature of the fuel in the new, lower target temperature and/or the reduced temperature range.

In some embodiments, method 400 includes determining, e.g., by the controller 202, a target power load of the power generation and/or mechanical drive system 100. The target power load may be demanded by the power grid or load attached to the turbine section 118. In some cases, the target power may fluctuate, increasing and/or decreasing, as the demands of the power grid or an attached load change or fluctuate. The controller 202 may determine a target operational speed and/or a target load for the combustor section 116, based on the target power from the grid or attached load. The target load may be the amount of power or electricity, which is needed by the power grid, for example.

The controller 202 may determine the target amount, e.g., a volume and/or a mass flow volume, of fuel that needs to be supplied to the combustor section 116 to enable the power generation system and/or mechanical drive 100 to produce a desired target power. The method 400 includes adjusting 416, by the controller 202, a flow parameter of the fuel. Adjusting 416 may include the controller 202 transmitting one or more output signals to the flow control device 224 such that the flow control device 224 adjusts, increases, or decreases, the amount of fuel supplied from the conditioning system 200 to the combustor section 116.

The method 400 may further include the controller 202 comparing the superheating definition to a comparison action logic. The comparison action logic may include the controller determining a difference between a temperature measured by any temperature sensor 210 and a determined dew point temperature, $T_x - T_{dewpt,x}$. The controller 202 may compare this difference, $T_x - T_{dewpt,x}$, to one or more criterion, see equation 4. If the criterion is met, the controller 202 will perform one or more actions. For example, if the difference is greater than 20° F., then the controller 202 maintains the system 100 conditions. In another example, if the difference is lower than 20° F., but greater than 5° F., the controller 202 may transmit one or more signals causing the user interface 306 to display a warning. In yet another example, if the difference is lower than 5° F., the controller 202 may transmit one or more command signals that cause a shutdown of one or more components of system 100, in order to protect the system 100 against condensation.

$$(\alpha \leq T_x - T_{dewpt,x}, x \geq b, AL; SD \ldots) \qquad (4)$$

In some embodiments, the method 400 includes determining a fuel flow rate, $\dot{F}$, of fuel being delivered to the combustor section 116. The method 400 may include determining a fuel flow rate, $\dot{F}$, during transient phases, e.g., during start-up, during ramp up and ramp down phases. In some embodiment, the method 400 includes determining a rate of change of the fuel flow rate over a period of time, $\delta \dot{F}/\delta t$. Determining $\delta \dot{F}/\delta t$ may include determining $\delta \dot{F}/\delta t$ during transient phases, e.g., during start-up, during ramp up and ramp down phases.

Further aspects of the present disclosure are provided by the subject matter of the following clauses:

1. A fuel conditioning system for use with a turbine, the fuel conditioning system comprising: a heater for selectively, dynamically adjusting an operating temperature of a fuel; and a controller communicatively coupled to the heater, the controller configured to: determine a dew point temperature of the fuel; and maintain the operating temperature of the fuel at least at the determined dew point temperature of the fuel.

2. The fuel conditioning system according to any preceding clause, wherein the conditioning system further comprises a temperature sensor for detecting an operating temperature of the fuel.

3. The fuel conditioning system according to any preceding clause, wherein the conditioning system further comprises a flow device for controlling a flow parameter of the fuel, wherein the controller is further configured to maintain a desired amount of fuel supplied to a combustor section of the turbine.

4. The fuel conditioning system according to any preceding clause, wherein the conditioning system further comprises: a pressure control device for selectively adjusting an operating pressure of the fuel downstream from the heater, wherein the controller is further configured to adjust the operating pressure of the fuel to facilitate decreasing the dew point temperature of the fuel and reducing a temperature drop through the conditioning system.

5. The conditioning system according to any preceding clause, wherein the conditioning system further comprises a composition sensor for detecting at least one component of the fuel; wherein the controller is further configured to determine a dew point temperature of the fuel based on a measured composition of the fuel.

6. The conditioning system according to any preceding clause, wherein the conditioning system comprises: a pressure sensor for detecting a pressure of the fuel; and a composition sensor for detecting at least one component of the fuel, wherein the controller is further configured to: determine a dew point temperature of the fuel based on a measured pressure of the fuel and a measured composition of the fuel; and determine a lower heating value of the fuel based on the determined a dew point temperature or a composition of the fuel to be used to define real-time or anticipated fuel flow demands.

7. The conditioning system according to any preceding clause, wherein the conditioning system further includes a pressure control device for adjusting an operating pressure of the fuel and a flow control device for adjusting a flow parameter of the fuel, wherein the flow control device is downstream from the pressure control device.

8. A gas turbine engine comprising: a combustor section; a conditioning system for conditioning a fuel, the conditioning system comprises: a controller configured to: determine a dew point temperature; and maintain the temperature of the fuel at least at the determined dew point temperature.

9. The gas turbine engine according to any preceding clause, wherein the gas turbine engine further comprises a temperature sensor for detecting an operating temperature of the fuel.

10. The gas turbine engine according to any preceding clause, wherein the conditioning system further comprises a flow device for controlling a flow parameter of the fuel, wherein the controller is further configured to maintain a desired amount of fuel to a combustor section.

11. The gas turbine engine according to any preceding clause, wherein the conditioning system further comprises a pressure control device for selectively adjusting a pressure of the fuel, wherein the controller is configured to: adjust an operating pressure of the fuel to facilitate decreasing the dew point temperature of the fuel and reducing a temperature drop through the conditioning system.

12. The gas turbine engine according to any preceding clause, wherein the conditioning system further comprises a composition sensor for detecting at least one component of the fuel, and wherein the controller further configured to: determine a dew point temperature of the fuel based on a measured composition of the fuel determine a lower heating value of the fuel based on a measured composition of the fuel to be used to define real-time or anticipated fuel flow demands.

13. The gas turbine engine according to any preceding clause, wherein the gas turbine engine comprises: a composition sensor for detecting at least one component of the fuel; and a pressure sensor for detecting a pressure of the fuel, wherein the controller is further configured to: determine a dew point temperature of the fuel based on a measured composition of the fuel and the measured pressure.

14. The gas turbine engine according to any preceding clause, wherein the conditioning system further includes a pressure control device for adjusting a pressure of the fuel and a flow control device to adjust a flow parameter of the fuel, wherein the flow control device is downstream from the pressure control device.

15. A method of conditioning a fuel, the method comprising: determining a dew point temperature of the fuel; and maintaining an operating temperature of the fuel to be at a temperature that is at least at the determined dew point temperature.

16. The method according to any preceding clause, wherein the method further comprises: detecting a pressure of the fuel; detecting a composition of the fuel; and determining a dew point temperature of the fuel based on the detected pressure and the detected composition.

17. The method according to any preceding clause, wherein the method further comprises: adjusting a pressure of the fuel using a pressure control device to decrease the dew point temperature and reducing a temperature drop through the conditioning system; and maintaining the fuel temperature above the decreased dew point temperature.

18. The method according to any preceding clause, wherein the method further comprises: adjusting a flow of the fuel to facilitate to maintain a desired amount of fuel to a combustor section.

19. The method according to any preceding clause, wherein the method further comprises: monitoring a temperature using a temperature sensor.

20. The method according to any preceding clause, wherein the method further comprises: adjusting a pressure of the fuel to decrease the dew point temperature and reduce a temperature drop though a conditioning system; adjusting a flow parameter of the fuel using a flow control device to maintain a desired amount of fuel delivered to a combustor section.

21. The method according to any preceding clause, where in the method further comprises: Determine a target fuel flow prior to a transient phase of a gas turbine engine; and adjusting a thermal energy supplied from a heater to the fuel prior to the transited phases of the turbine.

In embodiments described herein, the conditioning system, including the controller, variably adjusts the heat supplied to the fuel such that the operating temperature of the fuel is consistently maintained at a pre-defined or selected dew point temperature and/or a superheat temperature, and/or any other suitable temperature and/or pressure. Embodiments of the conditioning system are enabled to target a real-time temperature, a dew point temperature, and/or a super heat temperature of the fuel during transient phases in the power generation system and also during steady-state operations. In particular, the conditioning system ensures that the fuel enters the combustor, at or above the dew point temperature, and as such, no fuel condensates will be introduced into the combustor section. The conditioning system may be coupled to a variable gas fuel supply system, wherein the composition of the fuel may be varied. The controller determines a real-time dew point that is specific to the fuel composition, based on received sensor information such as a real-time pressure and/or real-time composition.

Accordingly, in embodiments described herein the controller is able to determine an accurate and real-time dew point temperature. In the exemplary embodiments described herein, the conditioning system includes at least one pressure control device that may be used to dynamically adjust the pressure of the fuel, thereby decreasing the dew point temperature, and reducing the temperature drop through the conditioning system. For example, in embodiments described herein, the controller may reduce the operating pressure of the fuel, to lower the temperature drop, and thus reduce the required thermal energy to heat the fuel above the dew point. In some embodiments described herein, the controller may predict a temperature drop between an upstream location and a downstream location, e.g., through the conditioning system, which may occur during a subsequent transient phase, and accordingly, the controller may preemptively adjust the amount of thermal energy supplied to the fuel, prior to the transient phase. As a result, the overall efficiency of the power generation and/or mechanical drive system is facilitated to be improved. In embodiments described herein, the controller may adjust a flow parameter of the fuel such that the required amount of fuel is delivered to the combustor section, e.g., to maintain power generation and/or mechanical drive of the turbine engine at a desired level.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments of systems and methods, including the best mode, and also to enable any person skilled in the art to practice the systems and methods, including making and using any devices or systems and performing any incorporated methods. The patentable scope of the systems and methods is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel conditioning system for use with a turbine, the fuel conditioning system comprising:
    a heater for selectively, dynamically adjusting an operating temperature of a fuel;
    a pressure control device for dynamically adjusting an operating pressure of the fuel; and
    a controller communicatively coupled to the heater and the pressure control device, the controller configured to:
        determine a first dew point temperature of the fuel at a first time;
        selectively adjust the pressure of the fuel using the pressure control device to reduce the first dew point temperature to a second dew point temperature that is lower than the first dew point temperature;
        predict a temperature drop over a transient phase, wherein during the transient phase the turbine changes from an initial fuel flow rate to a target flow rate;
        determine, based on the predicted temperature drop, an amount of thermal energy needed to maintain the temperature of the fuel above the second dew point temperature over the transient phase; and
        adjust an operating parameter of the heater prior to the transient phase, to maintain the operating temperature of the fuel at or above the second dew point temperature during the transient phase.

2. The fuel conditioning system in accordance with claim 1, further comprising a temperature sensor for detecting the operating temperature of the fuel.

3. The fuel conditioning system in accordance with claim 1, further comprising a flow device for controlling a flow parameter of the fuel, wherein the controller is further configured to maintain a desired amount of fuel supplied to a combustor section of the turbine.

4. The fuel conditioning system in accordance with claim 1, further comprising a composition sensor for detecting at least one component of the fuel, wherein the controller is further configured to determine at least one of the first dew point temperature and the second dew point temperature of the fuel based on the detected at least one component of the fuel.

5. The fuel conditioning system in accordance with claim 1, further comprising:
    a pressure sensor for detecting the operating pressure of the fuel; and
    a composition sensor for detecting at least one component of the fuel,
    wherein the controller is further configured to:
        determine at least one of the first dew point temperature and the second dew point temperature of the fuel based on the operating pressure of the fuel detected by the pressure sensor and the detected at least one component of the fuel; and
        determine a lower heating value of the fuel based on the detected at least one component of the fuel.

6. The fuel conditioning system in accordance with claim 1, further comprising a flow control device for adjusting a flow parameter of the fuel, wherein the flow control device is downstream from the pressure control device.

7. A gas turbine engine comprising:
    a combustor section;
    a conditioning system for conditioning a fuel, the conditioning system comprising:
    a heater for selectively, dynamically adjusting an operating temperature of the fuel;
    a pressure control device for dynamically adjusting an operating pressure of the fuel; and
    a controller communicatively coupled to the heater and the pressure control device, the controller configured to:
        determine a first dew point temperature of the fuel at a first time;
        selectively adjust the pressure of the fuel using the pressure control device to reduce the first dew point temperature to a second dew point temperature that is lower than the first dew point temperature;
        predict a temperature drop over a transient phase, wherein during the transient phase the gas turbine engine changes from an initial fuel flow rate to a target flow rate;
        determine, based on the predicted temperature drop, an amount of thermal energy needed to maintain the temperature of the fuel above the second dew point temperature over the transient phase; and
        adjust an operating parameter of the heater prior to the transient phase, to maintain the operating temperature of the fuel at or above the second dew point temperature during the transient phase.

8. The gas turbine engine in accordance with claim 7, wherein the gas turbine engine further comprises a temperature sensor for detecting the operating temperature of the fuel.

9. The gas turbine engine in accordance with claim 7, wherein the conditioning system further comprises a flow device for controlling a flow parameter of the fuel, wherein the controller is further configured to maintain a desired amount of fuel to the combustor section.

10. The gas turbine engine in accordance with claim 7, wherein the conditioning system further comprises a composition sensor for detecting at least one component of the fuel, wherein the controller is further configured to:
- determine at least one of the first dew point temperature and the second dew point temperature of the fuel based on the detected at least one component of the fuel; and
- determine a lower heating value of the fuel based on the detected at least one component of the fuel.

11. The gas turbine engine in accordance with claim 7, wherein the conditioning system comprises:
- a composition sensor for detecting at least one component of the fuel; and
- a pressure sensor for detecting the operating pressure of the fuel,
- wherein the controller is further configured to:
  - determine at least one of the first dew point temperature and the second dew point temperature of the fuel based on the detected at least one component of the fuel and the operating pressure detected by the pressure sensor.

12. The gas turbine engine in accordance with claim 7, wherein the conditioning system further includes a flow control device to adjust a flow parameter of the fuel, wherein the flow control device is downstream from the pressure control device.

* * * * *